United States Patent
Park et al.

(10) Patent No.: US 7,854,916 B2
(45) Date of Patent: Dec. 21, 2010

(54) PROCESS FOR PREPARING BARIUM TITANATE

(75) Inventors: Sei-Ung Park, Daejeon (KR); Choong-Hoon Paik, Daejeon (KR); Ju-Suk Ryu, Daejeon (KR); Seong-Jae Lim, Daejeon (KR); Jin-Soo Baik, Daejeon (KR); Young-Soo Jang, Ulsan (KR)

(73) Assignee: Hanwha Chemical Corporation, Seoul (KR)

( * ) Notice: Subject to any disclaimer, the term of this patent is extended or adjusted under 35 U.S.C. 154(b) by 106 days.

(21) Appl. No.: 11/989,856

(22) PCT Filed: Aug. 1, 2006

(86) PCT No.: PCT/KR2006/003025
§ 371 (c)(1),
(2), (4) Date: Mar. 9, 2009

(87) PCT Pub. No.: WO2007/015622
PCT Pub. Date: Feb. 8, 2007

(65) Prior Publication Data
US 2009/0202425 A1    Aug. 13, 2009

(30) Foreign Application Priority Data
Aug. 4, 2005    (KR) ............... 10-2005-0071204

(51) Int. Cl.
*C01G 23/00* (2006.01)
*C01F 11/02* (2006.01)
(52) U.S. Cl. .................. 423/598; 423/594.16
(58) Field of Classification Search .......... 423/598, 423/594.16
See application file for complete search history.

(56) References Cited

U.S. PATENT DOCUMENTS 3,896,216 A * 7/1975 Fagherazzi et al. .......... 423/598

(Continued)

FOREIGN PATENT DOCUMENTS

JP    05139744 A * 6/1993

(Continued)

OTHER PUBLICATIONS

Qi et al. "Short-range dissolution-precipitation crystallization of hydrothermal barium titanate", Journal of the European Ceramic Society 24 (2004) 3553-3557.*

*Primary Examiner*—Stanley Silverman
*Assistant Examiner*—Anthony J Zimmer
(74) *Attorney, Agent, or Firm*—Clark & Brody

(57) ABSTRACT

The present invention relates to a hydrothermal synthesis for preparing barium titanate powder as the essential material for a multi-layer ceramic capacitor. The object of the invention is to prepare barium titanate powder having high purity, particle size of submicron order, uniform particle distribution and excellent crystallinity, by reacting hydrous titanic acid compound prepared via sulfuric acid process with crystalline titanium oxide and barium hydroxide, as the starting material, at a temperature between 60° C. and 300° C. under a pressure between 5 Kgf/cm2 and 50 Kgf/cm2. The process for preparing barium titanate according to the present invention provides barium titanate powder having Ba/Ti molar ratio of 1.000±0.002 and high purity by applying calcination under reductive condition to the solid product obtained from hydrous titanic acid compound prepared via sulfuric acid process with crystalline titanium oxide and barium hydroxide, as the starting substances, to convert barium sulfate, which was produced from residual sulfide in the raw material, to barium titanate.

8 Claims, 2 Drawing Sheets

U.S. PATENT DOCUMENTS

| | | | |
|---|---|---|---|
| 4,863,883 A * | 9/1989 | Menashi et al. | 501/138 |
| 4,898,843 A * | 2/1990 | Matushita et al. | 501/136 |
| 4,946,810 A * | 8/1990 | Heistand et al. | 501/137 |
| 5,032,375 A * | 7/1991 | Lerot et al. | 423/598 |
| 5,523,065 A * | 6/1996 | Stangle et al. | 423/71 |
| 6,264,912 B1 * | 7/2001 | Hu | 423/598 |
| 6,409,983 B1 * | 6/2002 | Choi et al. | 423/598 |
| 6,485,701 B2 * | 11/2002 | Miyoshi | 423/594.9 |
| 6,692,721 B2 * | 2/2004 | Hur et al. | 423/598 |
| 7,138,102 B2 * | 11/2006 | Akimoto et al. | 423/593.1 |
| 2003/0044347 A1 * | 3/2003 | Shirakawa et al. | 423/598 |
| 2003/0133869 A1 * | 7/2003 | Hur et al. | 423/598 |
| 2004/0028601 A1 * | 2/2004 | Torii et al. | 423/598 |
| 2006/0078492 A1 * | 4/2006 | Kurozumi et al. | 423/598 |
| 2007/0202036 A1 * | 8/2007 | Jongen et al. | 423/593.1 |

FOREIGN PATENT DOCUMENTS

| | | |
|---|---|---|
| JP | 2002060219 A * | 2/2002 |
| KR | 2005010642 A * | 1/2005 |

* cited by examiner

PROCESS FOR PREPARING BARIUM TITANATE

FIELD OF THE INVENTION

The present invention relates to a process for preparing particulate barium titanate ($BaTiO_3$) powder which is utilized as an essential raw material for a multi-layer ceramic capacitor (MLCC), by hydrothermal synthesis of hydrous titanic acid compound prepared via sulfuric acid process, with crystalline titanium oxide and barium hydroxide, as the starting material. More specifically, it relates to a process for efficiently removing residual sulfur compound in the starting material through the process of calcination to give high purity, and exactly controlling Ba/Ti molar ratio.

BACKGROUND OF THE RELATED ART

Barium titanate is a dielectric substance which shows different dielectric properties depending on the crystal phase and particle size of crystals. It is utilized as essential raw material for a multi-layer ceramic capacitor and a positive temperature coefficient resistor (PTCR), or the like. Recently, development of multi-layer ceramic capacitors has a trend of miniaturization and pursuing high capacity. Since the number of layers should increase in order to realize high capacity with a small size, enhancement of powder characteristics of barium titanate such as particle size, shape, purity, crystallinity, or the like is required.

Traditional processes for preparing barium titanate generally include solid processes and liquid processes. According to the solid process, a traditional process for preparing ceramic powder, barium titanate is prepared by essentially reacting a mixture of barium carbonate and titanium oxide with thermal treatment at a high temperature. However, barium titanate powder thus obtained cannot be employed in preparing a ceramic capacitor with a number of layers having high capacity, since it has large particle diameter, broad distribution of particle size, and non-uniform particle shape, and also requires relatively high temperature for sintering. On the other hand, the liquid processes, including hydrothermal synthesis, hydroxide process and sol-gel process, result in most excellent properties in crystallinity of powder, particle size distribution and particle shape. Hydrothermal synthesis is a representative among them, being suitable for preparing a capacitor having a number of layers with high capacity.

As a rule, a hydrothermal synthesis comprises reaction of barium hydroxide with hydrous titanic acid compound. Though barium titanate may be obtained only if the mixture is heated under ambient pressure, reaction under higher temperature and pressure gives barium titanate having high crystallinity. Thus, the reaction utilizes a process with applying high temperature/pressure in an air-tight reactor. Crystalline barium titanate is industrially produced by preparing barium tetrachloride in gel-like hydrate from titanium tetrachloride and barium chloride as the starting material, and mixing barium chloride with an alkaline metal hydroxide as a mineralizer, and reacting the mixture at a temperature between 60° C. and 300° C. under high pressure not less than ambient pressure. According to the process, the feature of particles produced can be controlled by adjusting the parameters such as temperature and pressure. Though calcining stage is required after the synthesis, relatively lower temperature is needed as compared to the solid process. In addition, the process provides barium titanate powder which is suitable for a capacitor having a number of layers with high capacity, since it enables the preparation of barium titanate powder having excellent crystallinity as spherical particles, and small and uniform particle size and distribution.

There are numerous patents regarding such hydrothermal processes. Among them, Korean Patent Publication No. 1993-0002232 discloses a process for preparing $ABO_3$-type perovskite-like ceramic powder, wherein alkaline metal hydroxide as a mineralizer is added to a hydrolyzed aqueous titanium chloride solution and barium chloride as the starting material to carry out hydrothermal reaction, and the residual barium hydroxide in the reactant is treated with an insolubilizer such as carbon dioxide to adjust the molar ratio of Ba/Ti. However, such a process employs excess amount of alkaline metal hydroxide to give residual alkaline metal in the product, to necessitate excess washing process, while expensive anti-corrosive reaction device is needed because chlorine contained in the starting material causes corrosion of the reactor. Further, when the residual barium hydroxide is converted to barium carbonate by treating with an insolubilizer, rod-like barium carbonate having the size of several micrometers is produced, which may not completely participate in calcining stage, to form barium oxide or to be polarized on the surface of barium titanate particle to cause abnormal sintering.

In order to solve those problems described above, Korean Patent No. 10-0428496 and Korean Patent Laid-Open No. 10-2004-0069044 states that a process for preparing particulate barium titanate can be provided, which comprises hydrothermally reacting a mixture of relatively stable titanium hydroxide in an amorphous state without containing chloride ion prepared by sulfuric acid process, and excess amount of barium hydroxide, filtering the reaction mixture, washing with water and drying. However, the reaction is difficult to be completed according to such a process, and the molar ratio of Ba/Ti is hard to be tailored during the course of washing with water. In addition, the hydrous titanic acid compound prepared via sulfuric acid process inevitably contains residual sulfur compounds in the form of sulfate as impurities, which are hard to be washed off by water and reacts with barium hydroxide during the hydrothermal reaction to form barium sulfate. Barium sulfate is a thermally stable compound being insoluble in water or organic solvent, so that it cannot be removed through water-washing or calcining. Commercially available hydrous titanic acid compound prepared by sulfuric acid process is metatitanic acid, of which the purest one contains from 0.3 to 0.8% by weight of sulfur compounds: if it is employed in preparing barium titanate, the product will contain from about 0.4 to 1.0% by weight of barium sulfate. If the raw material is washed by water to avoid such a result, hydrous titanic acid compound cannot be easily removed due to its ion exchanging ability, with its critical concentration of about 0.3% by weight. The residual barium sulfate in barium titanate essentially lowers the purity of barium titanate as well as the permittivity during the course of manufacturing a multi-layer ceramic condenser, and affects sintering property and temperature property of MLCC. Further, sulfur-containing gas is generated at the sintering stage performed at a temperature of 1300° C. or higher during the process for manufacturing a MLCC to cause corrosion of nickel electrode, thereby resulting in inferiority of a condenser.

The present inventors have exerted all efforts to analyze the problems and seek the solution in order to achieve above-mentioned object of the invention, and as a result of a number of experiments, they found that highly pure particulate barium titanate particles can be obtained with overcoming the problems resulted from conventional hydrothermal synthesis, by efficiently removing the sulfur-containing impurities while employing hydrous titanic acid compound prepared by sulfuric acid process, and also found a method to adjust the molar ratio of Ba/Ti during the course of reaction, to complete the present invention.

DISCLOSURE

Technical Problem

Thus, the object of the present invention is to provide particulate barium titanate powder having high crystallinity and high purity, which is used as a primary raw material for preparing a MLCC of high capacity, by overcoming the problems resulted from using hydrous titanic acid compound prepared via sulfuric acid process.

Another object of the present invention is to provide a process for preparing particulate barium titanate which drastically lowers the production cost by using a cheap and stable raw material, with excluding the risk of expensive equipments and raw material employed in conventional processes.

Technical Solution

The present invention relates to a process for preparing particulate barium titanate powder having high crystallinity and high purity.

The process for preparing barium titanate according to the present invention comprises the steps of
a) reacting hydrous titanic acid compound with crystalline titanium oxide and barium hydroxide, as the starting material, at a temperature between 60° C. and 300° C. under a pressure between 5 Kgf/cm² and 50 Kgf/cm² for a duration from 10 minutes to 10 hours;
b) drying and recovering the product; and
c) calcining the dry powder under reductive atmosphere at a temperature between 600° C. and 1400° C. for a duration from 10 minutes to 5 hours.

The present invention is characterized by using crystalline titanium oxide in addition to barium hydroxide and hydrous titanic acid compound, as the starting material. The reason for using crystalline titanium oxide is to adjust the molar ratio of Ba/Ti in advance, at the early stage of the reaction.

In case of using said starting material in the present invention, corrosion of the reactor owing to chloride ion can be fundamentally excluded, and use of alkaline metal hydroxide as a mineralizer can be avoided.

Other and further objects, features and advantages of the invention will appear more fully from the following description.

Hydrous titanic acid compound, one of the starting material of the present invention, is based on metatitanic acid $(TiO(OH)_2)$, but orthotitanic acid $(Ti(OH)_4)$, titanium hydrate $(TiO_2 \times H_2O)$, or a mixture thereof may be employed.

In general, when using metatitanic acid and barium hydroxide as the raw material, the reaction is represented by a reaction formula as follows:

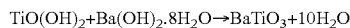

$$TiO(OH)_2 + Ba(OH)_2 \cdot 8H_2O \rightarrow BaTiO_3 + 10H_2O$$

According to the reaction formula, essentially an excess amount of barium hydroxide should be added. If barium hydroxide is used in the same equivalent amount as that of metatitanic acid, sufficient pH condition cannot be attained, so that the reaction cannot be fully completed to leave unreacted residue, which may reduce the yield. In addition, the unreacted barium hydroxide is washed off at the time of washing with water, to result in an inappropriate molar ratio of Ba:Ti; this affects the calcining process to result in particles having low crystallinity with lack of uniformity, that cannot be possibly used for preparation of MLCC. When an excess amount of barium hydroxide is added, the reactivity increases, but a strongly alkaline waste water is produced after the reaction, and the molar ratio of Ba/Ti cannot be exactly controlled because of varying amount of eluted barium depending on the degree of water-washing.

Thus, the present invention employs a method of using an excess amount of barium hydroxide to overcome those problems, provided that anhydrous crystalline titanium oxide having an equivalent amount corresponding to the excess amount is admixed and reacted. The reaction temperature is from 60 to 300° C., the pressure from 5 to 50 Kgf/cm², and the reaction time from 10 minutes to 10 hours.

The crystalline titanium oxide may be employed regardless of the crystalline shapes such as anatase titanium oxide, rutile titanium oxide, brookite titanium oxide, and a mixture thereof. Preferably used is anatase titanium oxide. Having neutral pH, titanium oxide does not affect pH of the entire reaction system, and only a certain amount of the compound participates in the reaction, so that the reaction mixture contains barium titanate, titanium oxide and unreacted barium hydroxide after the reaction.

Drying the obtained product gives dry powder having the molar ratio of Ba/Ti of 1.00 throughout the entire system. For the drying stage, spray drying or hot-air drying wherein the powder can be recovered without losing the solid content is preferably used.

By calcining the resultant powder, the reaction is completed, and the entire product can be converted to crystalline barium titanate. Sulfur-containing compounds inherently contained in metatitanic acid before calcination react with barium hydroxide to produce barium sulfate, which, being remained in the reaction mixture, is difficult to be removed due to its thermal stability (decomposed at a temperature of 1400° C. or higher) and strong resistance to chemicals such as acid and base. However, being based on the findings that reductive atmosphere given by using a mixed gas of hydrogen and inert gas during the calcining stage reacts with unreacted titanium oxide remained in the reactant to form barium titanate. By adopting such a method, the sulfur compounds retained in the reaction product can be removed to the presence of extremely small content. The reaction formula is written as follows:

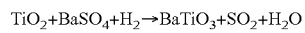

$$TiO_2 + BaSO_4 + H_2 \rightarrow BaTiO_3 + SO_2 + H_2O$$

In the calcining stage mentioned above, the mixed gas to form a reductive atmosphere comprises from 99.9 to 90% by weight of inert gas selected from nitrogen, argon or helium and from 0.1 to 10% by weight of hydrogen, and the calcining temperature may be from 600 to 1400° C., more preferably from 800 to 1200° C.

MODE FOR INVENTION

The process for preparing barium titanate according to the present invention is further described by the following examples, which are provided for illustration only and are not intended to be limiting in any way.

Example 1

Figure 1:
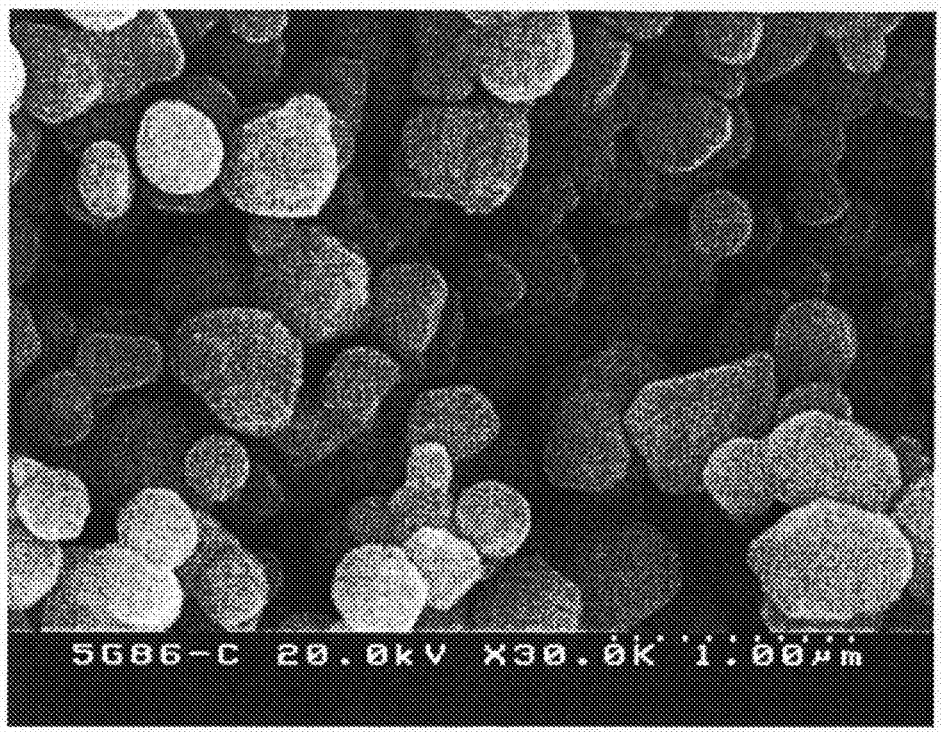
FIG. 1 is a scanning electron microphotograph (FE-SEM) magnified 30,000 times of the barium titanate powder prepared according to Example 1 of the present invention.

A dispersion (1.0 L) prepared by mixing metatitanic acid (0.5M) and anatase $TiO_2$ (0.1M), and an aqueous 0.6M barium hydroxide solution (1.0 L) were employed as raw material. These two aqueous solutions were introduced to a SUS reactor with Teflon lining having 3 L of inner volume. After sealing the reactor, the reaction temperature was raised at a rate of 5.0° C./min. By using an agitator on the top of the reactor, the reaction mixture was stirred at a speed of 300 rpm, and the reaction temperature was raised to 180° C., where the pressure was 10 Kgf/cm$^2$. The reaction solution was maintained for 2 hours and then cooled. When the temperature of the reaction solution reached ambient temperature, the valve at the bottom of the reactor was opened to recover the reaction product solution, which was then spray-dried to obtain dry powder. The powder was placed in a hot furnace of atmosphere control type, and calcined with the flux of a mixed gas of nitrogen/hydrogen (2%) at a temperature of 1000° C. for 2 hours. Analysis of the powder recovered after calcining by XRD showed Ba/Ti molar ratio of 1.001, and the analytic result of k-factor by using XRD showed 5.4. As a result of quantitative analysis by using XRF, S content was 32 ppm. Specific surface area according to BET method was 3.2 m$^2$/g. As a result of analysis of particle shape and size by using FE-SEM, it was found that the particle shape was round and uniform without aggregation among the particles, and average particle size for spherical shape was 0.3 micrometer (see FIG. 1). The powder was formulated with X7R, and pressed into a disc having 10 mm of diameter and 3 mm of thickness, which was then sintered at 1320° C. The sintered density of the disc sample thus prepared was 5.81 g/cm$^3$. After spreading In/Ga paste on both side of the sample and drying, the electric feature was analyzed. As a result, the permittivity was 2050, DF 0.09%, IR 2.0*10$^{11}$, and the results of TCC analysis showed 6.22 of change of permittivity at 125° C., and 1.6% at −55° C.

Example 2

Figure 2:
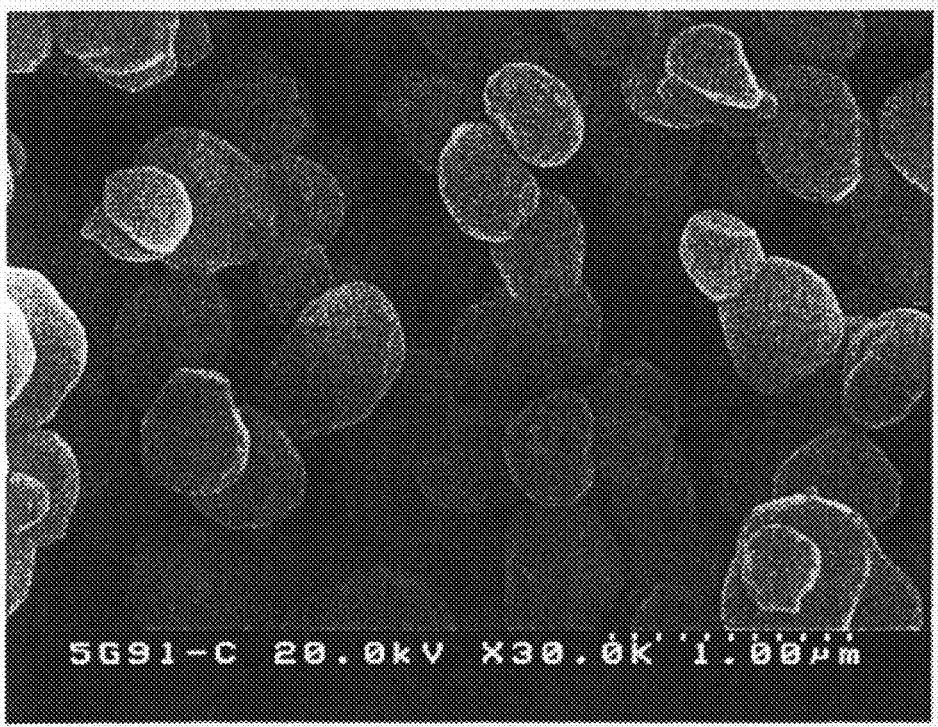
FIG. 2 is a scanning electron microphotograph (FE-SEM) magnified 30,000 times of the barium titanate powder prepared according to Example 2 of the present invention.

The reaction was carried out under the same condition as in Example 1, but the calcining temperature was set at 1100° C. The powder recovered showed Ba/Ti molar ratio of 1.000 according to the analysis by using XRD, and the analytic result of k-factor by using XRD showed 7.3. As a result of quantitative analysis by using XRF, S content was 12 ppm. Specific surface area according to BET method was 2.9 m$^2$/g. As a result of analysis of particle shape and size by using FE-SEM, it was found that the particle shape was round and uniform without aggregation among the particles, and average particle size for spherical shape was 0.4 micrometer (see FIG. 2). The powder was formulated with X7R, and pressed into a disc having 10 mm of diameter and 3 mm of thickness, which was then sintered at 1320° C. The sintered density of the disc sample thus prepared was 5.82 g/cm$^3$. After spreading In/Ga paste on both side of the sample and drying, the electric feature was analyzed. As a result, the permittivity was 2250, DF 0.09%, IR 1.8*10$^{11}$, and the results of TCC analysis showed 7.3% of change of permittivity at 125° C., and 1.6% at −55° C.

COMPARATIVE EXAMPLE 1

Figure 3:
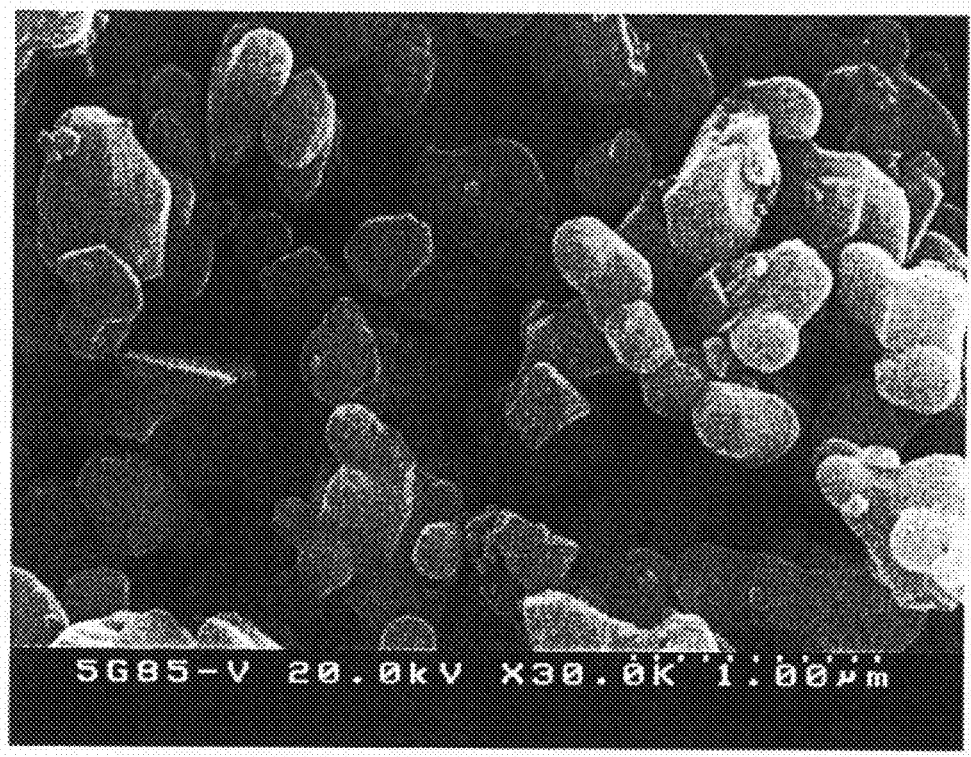
FIG. 3 is a scanning electron microphotograph (FE-SEM) magnified 30,000 times of the barium titanate powder prepared according to Comparative Example 1 of the present invention.

A dispersion (1.0 L) of metatitanic acid (0.5M) and an aqueous 0.6M barium hydroxide solution (1.0 L) were employed as raw material. These two aqueous solutions were introduced to a SUS reactor with Teflon lining having 3 L of inner volume. After sealing the reactor, the reaction temperature was raised at a rate of 5.0/min. By using an agitator on the top of the reactor, the reaction mixture was stirred at a speed of 300 rpm. When the reaction temperature reached 180° C., it was maintained for 2 hours, and then cooled. When the temperature of the reaction solution reached ambient temperature, the valve at the bottom of the reactor was opened to recover the reaction product solution, which was repeatedly washed with distilled water until no pH change appeared in the washed water, and spray-dried to obtain dry powder. The powder was placed in a hot furnace of atmosphere control type, and calcined with the flux of a mixed gas of nitrogen/hydrogen (2%) at a temperature of 1100° C. for 2 hours. Analysis of the powder recovered after calcining by XRD showed Ba/Ti molar ratio of 0.987, and the analytic result of k-factor by using XRD showed 2.3. As a result of quantitative analysis by using XRF, S content was 840 ppm. Specific surface area according to BET method was 2.6 m$^2$/g. As a result of analysis of particle shape and size by using FE-SEM, it was found that the particle shape was amorphous and non-uniform with relatively much aggregation among the particles, and average particle size for spherical shape was 0.42 micrometer (see FIG. 3). The powder was formulated with X7R, and pressed into a disc having 10 mm of diameter and 3 mm of thickness, which was then sintered at 1320° C. The sintered density of the disc sample thus prepared was 5.6 g/cm$^3$. After spreading In/Ga paste on both side of the sample and drying, the electric feature was analyzed. As a result, the permittivity was 1850, DF 0.1%, IR 1.7*10$^{11}$, and the results of TCC analysis showed 4.2% of change of permittivity at 125° C., and −24.2% at −55° C.

INDUSTRIAL APPLICABILITY

According to the present invention, disadvantages in conventional hydrothermal synthetic processes as well as the problem of residual sulfur-containing compound when using hydrous titanic acid compound as starting material have been overcome. In addition, the molar ratio of Ba/Ti could be controlled from the initial stage of the reaction by adding crystalline titanium oxide as the raw material. The process according to the present invention is also advantageous from the aspect of environment, in that it does not release waste water containing barium after the reaction. As the entire excess amount of Ba is participated in the reaction, the process gives drastic economic effects such as enhanced productivity resulted from improved yield and unnecessity of recovering stage for barium.

What is claimed is:
1. A process for preparing barium titanate, which comprises the steps of
a) reacting a hydrous titanic acid compound with crystalline titanium oxide and barium hydroxide, as the starting material, at a temperature between 60° C. and 300° C.

under a pressure between 5 Kgf/cm$^2$ and 50 Kgf/cm$^2$ for a duration from 10 minutes to 10 hours to form a product;

b) drying and recovering the product to form a dry powder; and c) calcining the dry powder under a reductive atmosphere at a temperature between 600° C. and 1400° C. for a duration from 10 minutes to 5 hours.

2. A process for preparing barium titanate according to claim 1, characterized in that the hydrous titanic acid is selected from metatitanic acid (TiO(OH)$_2$), orthotitanic acid (Ti(OH)$_4$), titanium dioxide hydrate (TiO$_2$×H$_2$O) or a mixture thereof.

3. A process for preparing barium titanate according to claim 1, characterized in that barium hydroxide is used in an excess amount with respect to the hydrous titanic acid, provided that crystalline titanium oxide in an equivalent amount corresponding to the excess amount is incorporated at the same time to the reaction.

4. A process for preparing barium titanate according to claim 1, characterized in that the crystalline titanium oxide is anatase titanium oxide, rutile titanium oxide, brookite titanium oxide or a mixture thereof.

5. A process for preparing barium titanate according to claim 1, characterized in that the drying step employs spray drying or hot air drying for recovering the powder without loss of solid content.

6. A process for preparing barium titanate according to claim 1, characterized in that the calcining step employs a mixed gas comprising 99.9~90% by weight of inert gas selected from nitrogen, argon or helium, and 0.1~10% by weight of hydrogen.

7. A process for preparing barium titanate according to claim 2, characterized in that the crystalline titanium oxide is anatase titanium oxide, rutile titanium oxide, brookite titanium oxide or a mixture thereof.

8. A process for preparing barium titanate according to claim 3, characterized in that the crystalline titanium oxide is anatase titanium oxide, rutile titanium oxide, brookite titanium oxide or a mixture thereof.

* * * * *